July 25, 1933.  M. M. FISHER  1,919,545
BRAKE SHOE GRINDER
Original Filed Sept. 2, 1930   3 Sheets-Sheet 3
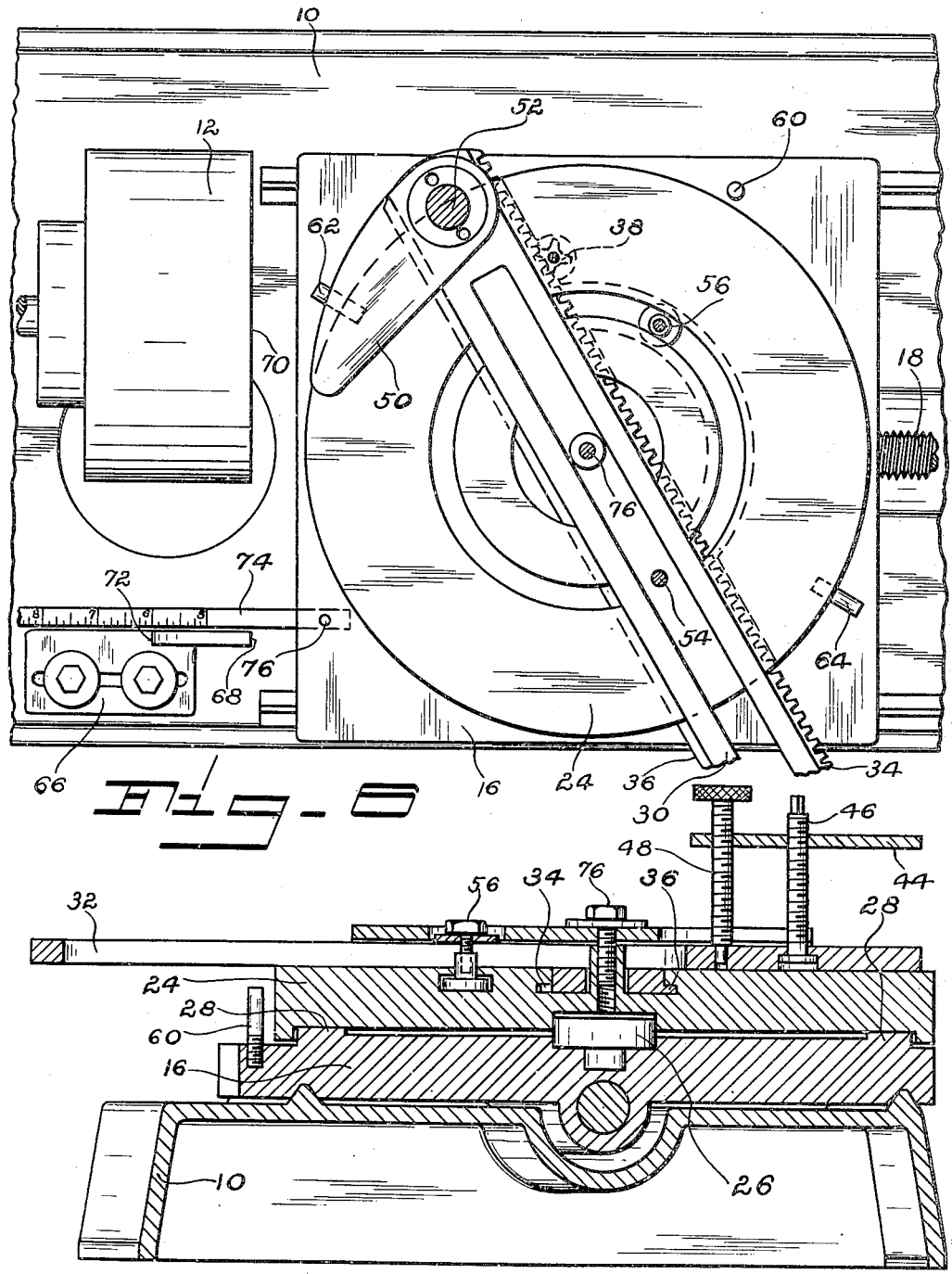

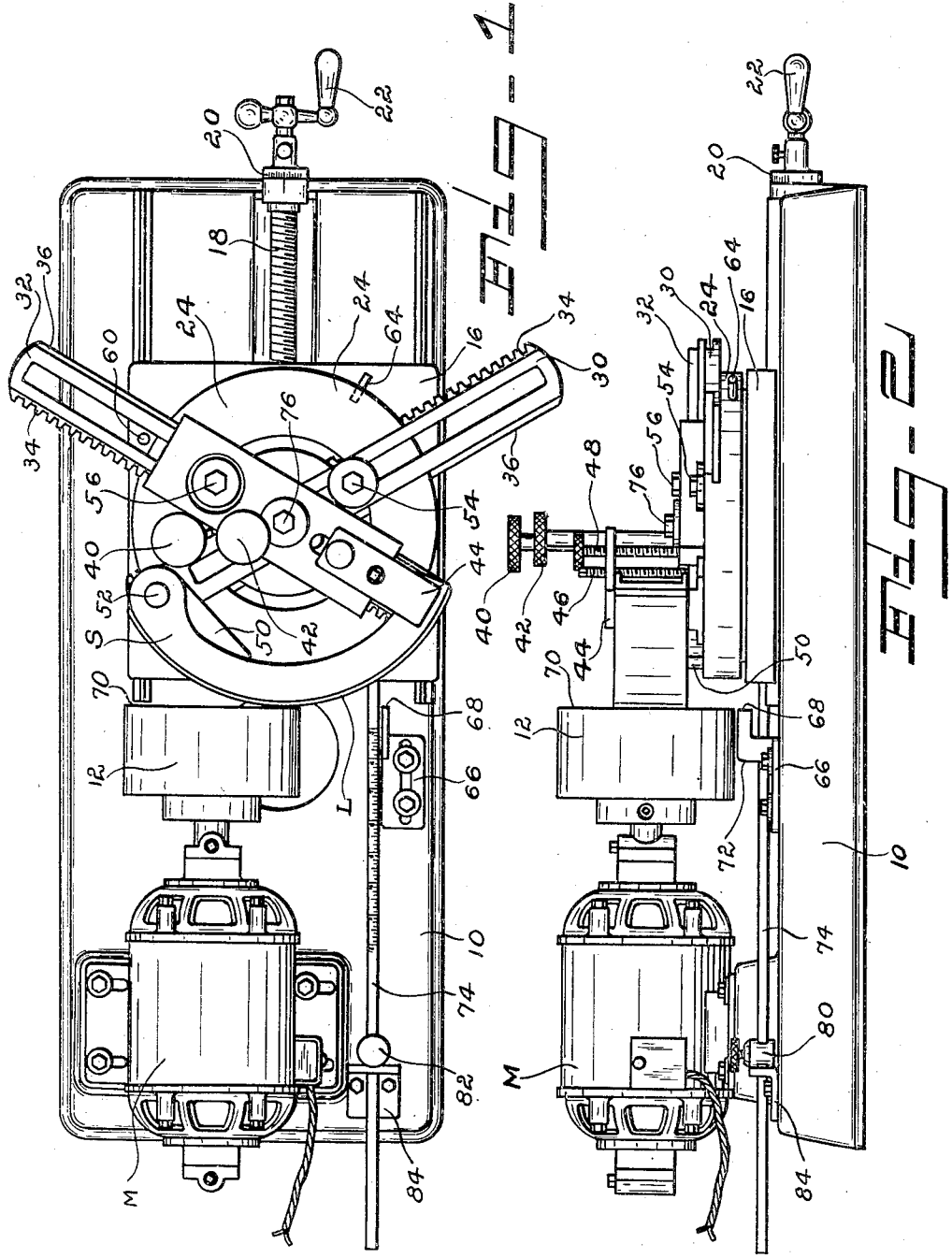

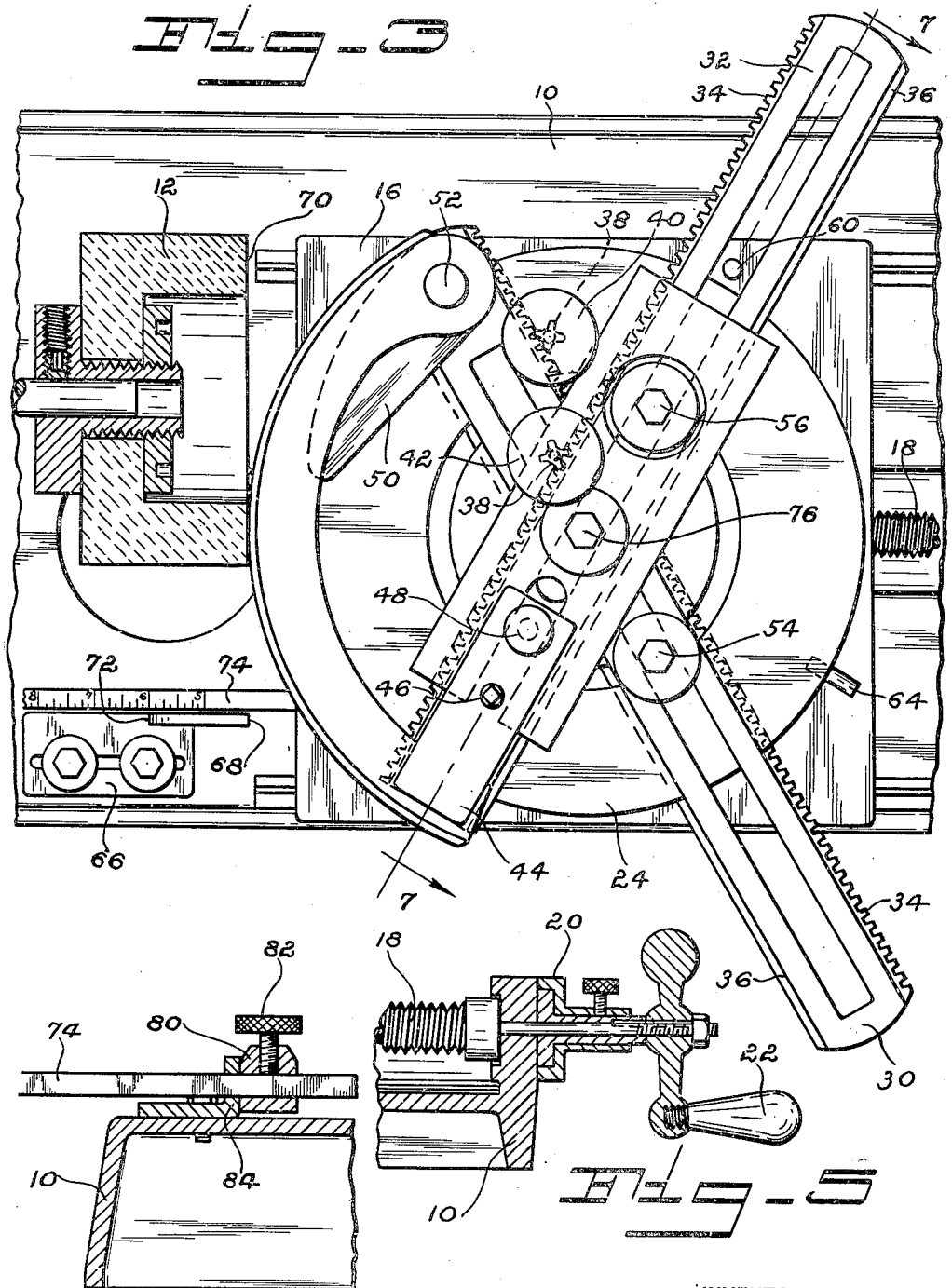

Patented July 25, 1933

1,919,545

UNITED STATES PATENT OFFICE

MARTIN M. FISHER, OF SEATTLE, WASHINGTON

BRAKE SHOE GRINDER

Application filed September 2, 1930, Serial No. 479,145. Renewed December 17, 1932.

My present invention relates to the art of relining brakes, and may be more specifically referred to as a brake lining grinder.

My invention is intended for use more particularly in the automotive field, although the principles it employs might find use in any line of endeavor where brake linings are used. In brakes for motor cars, however, it has been found necessary to have a lining disposed between the revolving brake drum and the expanding shoe. With the coming of four-wheel brakes in the automotive field the old problem of brake adjustment has been multiplied several times over. Whereas formerly it was only necessary to adjust two brakes on an automobile so that they would engage their respective drums equally, it is now necessary to adjust four brake drums with their respective linings and shoes so that they will all take their proper share of the braking effort.

If it be assumed, for instance, that a four-wheel brake system is to be relined the shoes which support and carry the brake lining are normally removed from their respective wheels, and brake lining material is secured to the shoes, usually by means of copper rivets. Now, normally the brake shoes are of substantially the same dimensions originally, but through use are quite deformed. It is apparent then that the deformed brake shoe will cause its lining to bear at only one point and, of course, this one point will soon wear down and throw the braking system out of adjustment. A similar condition results where the brake linings are not of uniform thickness. My invention is designed to overcome this deficiency. The most useful application of my invention, however, occurs when the brake drums on the car have become scored or roughened through use, usually as the result of the former brake lining wearing out at one point and the metal of the shoe thus coming in direct contact with the metal brake drum. In this case it is necessary to refinish the inner surface of the brake drum. This may be accomplished by grinding the same or by boring it. This will then provide a truly cylindrical surface but one which is larger in diameter than originally.

Let us assume that originally the inside diameter of the brake drum was 12 inches and in order to take care of the scoring it was necessary to bore out of the brake drum a sixteenth of an inch (this is not an unusual amount). We now have an inside diameter of 12⅛ inches, whereas the shoes which mated originally with the brake drums are intended for use on an inside diameter of only 12 inches. I believe it will be apparent that the smaller diameter brake shoe will only bear at one point of this circle. This creates the same condition formerly experienced—that after but limited use this point is worn down and it is then necessary to undergo the costly operation of readjusting all four brakes. Often it is necessary to repeat this readjustment of the brakes two or three times before the brakes get down to a point where they bear evenly as intended by their makers.

My machine is intended to grind the brake shoes, after lining, so that they will be on the same radius as the drum, to which they apply. In this particular case referred to I would grind the linings on the brake shoes so that they would conform to a 12⅛ inch diameter. Therefore:

The principal object of my invention is to provide a method and means whereby brake linings can be finished after being secured to the brake-shoes, to conform exactly in curvature to the brake drum they are to be used with.

Other and more specific objects will be apparent from the following description taken in connection with the accompanying drawings, wherein:

Figure 1 is a top plan view of my machine.

Figure 2 is a side elevation of the same.

Figure 3 is a fragmentary top plan view of the brake shoe holding means with certain of the parts shown in section.

Figure 4 is an enlarged sectional view showing my diameter stop device.

Figure 5 is a cross-sectional view through the feed screw.

Figure 6 is a top plan view similar to Figure 3, certain parts, however, being removed to better illustrate certain features.

Figure 7 is a cross-sectional view taken along the line 7—7 of Figure 3.

Referring to the drawings throughout which like reference characters indicate like parts, numeral 10 designates the main base member or frame of my machine. This I prefer to make of cast material. Secured to the upper surface of frame 10, at one end thereof, is the electric motor M. This has mounted upon its rotor shaft the grinding wheel 12, which is of that general type which grinds by contact with its end. It will be clear I believe that the grinding wheel 12 is driven at the speed of the motor which is necessarily quite high. Upon the upper surface of frame 10 at the opposite end from the motor are provided two V guides, such as are used on lathes and which form suitable guides for the carriage 16 of the shoe holding device.

Carriage 16 is movable longitudinally on frame 10 by a feed screw 18, similar to that which is used to move, for instance, the cross feed on a lathe, and which is provided with a graduated head at 20, for measuring the amount of feed, and the usual operating handle 22. Rotatably secured to the upper surface of carriage 16 is the brake shoe holder base 24. This must be arranged so it may revolve for at least a part of a revolution about a vertical axis. Any form of suitable construction might be used. I have found a satisfactory method to be in having a central pivot member 26, which is fixedly secured to the carriage 16 and about which base 24 is free to revolve. To provide the necessary rigidity I further provide a bearing ring 28, and prefer to machine the under portion of base 24 so that it will bear only on this ring.

Slidably secured in grooves cut in base 24 are the adjustable arms 30 and 32, which may be termed the pin arm and the free end arm respectively. Arms 30 and 32 are arranged to be retained against upward movement within base 24 by any of the well known expedients. In the instance shown I indicate outstanding ledges 34 and 36, for which suitable passages are machined in base 24. In ledge 36 I prefer to cut a rack gear, and have provided a gear pinion 38 to mesh with the same. The method of securing and moving member 30 and 32 is identical and I have provided the knurled headed screws 40 and 42 respectively for their operation. It is not essential to the operation of my machine that this exact construction be employed but I have found it very desirable to have some convenient means for moving the arms a small amount, thus making it possible to make fine adjustments without having to tap, as with a hammer or mallet, the arm members.

Arm 32 is provided with a parallel clamp means which is illustrated in Figures 2, 3 and 7, and consists of clamp member 44 and two screws 46 and 48, which are adapted to move plate 44 vertically so as to adjust it to the various sizes of brake shoes, and to clamp the same in place. As shown, member 32, carrying with it the clamp means referred to, is disposed above member 30, and to compensate for the difference in height of these two members I find it necessary to provide a lever or rest 50, which is pivoted at 52. At 52 I provide a female thread, into which may be inserted pins of various diameters, it being necessary to provide pins which will exactly fit the pivot pin holes of the various sized brake shoes. Lever 50 must be selected of such thickness that its upper surface will be on the same horizontal plane as the upper surface of member 32, in order to provide a horizontal plane for the brake shoe to rest upon. Arms 30 and 32 are provided with locking bolts 54 and 56 respectively. As a matter of safety to the end of preventing the ends of arms 30 and 32 being swung into the grinding wheel 12, I provide a pin 60 in carriage 16, and two limit stops 62 and 64 on the revolvable base 24. This limits the total swing to the extent that the arms cannot be inadvertently damaged.

To facilitate quick and accurate setting of my device I provide a guide means 66, which is adjustable longitudinally on base 10 and maintained in position by suitable lock screws. The adjustable feature is necessary to compensate for the wear on grinding wheel 12. As wheel 12 wears and becomes out of true it must be dressed to a new plane surface, and sufficient adjustment is provided in member 66 to permit the edge 68 at all times being in the plane of the working edge 70 of wheel 12. The opposite edge 72 of the upstanding lug is used as an index and a measuring rod 74 is provided as a means of measuring the distance from the exact center 76 of base 24 to the face 70 of wheel 12. To accomplish this the measuring rod 74 is fixedly secured as at 76 to carriage 16, and is thus moved with the said carriage. A limit stop is provided in the stop member 80 which is adjustably secured to rod 74 by the lock screw 82. A fixed stop 84 is attached to or formed as a part of frame 10, and serves in the dual capacity of a guide for rod 74 as it goes back and forth through it, and as a limiting abutment for stop 80.

*Method of operation*

In operating my device it is first required that suitable lining L be secured, in any customary manner, to the brake shoe S. It is then necessary to measure the exact inside diameter of the brake drum. Ordinarily brake drums of a given make of car are all the same size originally but if it is necessary to refinish the same they will, of course, be larger. Given the exact inside diameter of the brake drum, carriage 16 is moved longitudinally by means of screw 18 until the measuring rod indicates at index 72 the exact radius or diameter, according to the type of graduation, of the brake drum to which the shoe is to be fitted. When the carriage has been set to the index at the proper graduation, stop 80 is moved up against abutment 84. This is a guaranty that the exact arc will result. An experienced man will soon determine by inspection the amount of grinding necessary for various types of shoes to provide a true arc. Some types of shoes are very easily deformed and would require more grinding, it being, of course, desirable to grind off the minimum amount of lining.

Before the final setting of the brake shoes has taken place it is necessary for the operator to back off screw 18 an amount equal to the grinding that will be necessary. This is indicated on the graduated head at 20.

Assuming the brake shoe to be in position with its eye upon the proper sized post inserted at 52 and its free end clamped by clamp member 44, base 24 is revolved until arm 30 is at right angles to face 70 of the wheel or parallel to the longitudinal axis of the wheel. Then by manipulation of screw 40 adjustment is made until the lining is in easy contact with the face of the wheel. Base 24 is then swung about until arm 32 is parallel to the axis of the stone and like adjustment is effected by means of screw 42. Stone 12 is then revolved at high speed and member 24 revolved by hand. This is repeated several times with the appropriate adjustment of screw 18 until finally stop 80 contacts its abutment 84 and advises the operator that he has reached the true radius.

If it is found that with this adjustment sufficient grinding was not provided for to entirely reduce the lining to exact arc, a re-setting of the shoe by means of arms 30 and 32 will be necessary.

The foregoing description and the accompanying drawings are believed to clearly lisclose a preferred embodiment of my invention but it will be understood that this disclosure is merely illustrative and that such changes in the invention may be made as are fairly within the scope and spirit of the following claims:

What I claim is:

1. A brake shoe grinder consisting of a base; grinding means mounted upon said base; a carriage mounted to move longitudinally of said base; longitudinally dispose guides for said carriage; a holder base mounted upon said carriage in a manner to permit partial revolution about a centrally disposed, vertical axis; two adjustable arms mounted to slide, longitudinally, across said holder base, one arm adapted to receive a shoe positioning pin, and the other provided with clamp means adapted to secure the free end of a brake shoe, the two arms adapted to co-act to hold a brake shoe in proper grinding position; and separate means adapted to provide a slow motion movement to each of said arms.

2. A brake shoe grinder consisting of a base; a grinder mounted upon said base; drive means for said grinder; a carriage mounted to move longitudinally of said base; a holder base mounted upon said carriage in a manner to permit partial revolution about a central vertical axis; two adjustable arms mounted to slide, longitudinally, across said holder base, one arm adapted to receive a shoe positioning pin, and the other provided with a clamp means adapted to secure the free end of a brake shoe, the two arms adapted to co-act to hold a brake shoe in proper grinding position; an adjustable guide adapted to be aligned with the working face of the grinder face; and a measuring rod secured to the carriage and co-acting with said guide to provide means for setting the carriage to the arc desired.

3. A brake shoe grinder consisting of a base; a face grinder mounted upon said base; drive means for said grinder; a carriage mounted to move longitudinally of said base; a holder base mounted upon said carriage in a manner to permit partial revolution about a central vertical axis; two adjustable arms mounted to slide, longitudinally, across said holder base, one arm adapted to receive a shoe positioning pin, and the other provided with a clamp means adapted to secure the free end of a brake shoe; the two arms adapted to co-act to hold a brake shoe in proper grinding position; an adjustable guide adapted to be aligned with the working face of the grinder face; a measuring rod secured to the carriage and co-acting with said guide to provide means for setting the carriage to the arc desired; a fixed stop on said base serving as a guide for the measuring rod; and a stop member adjustably secured to the measuring rod and adapted to co-act with the fixed stop to indicate when the brake shoe has been ground to the radius desired.

4. A brake shoe grinder consisting of a base; grinding means mounted longitudinally upon said base; a carriage mounted to move longitudinally of said base; a holder base mounted upon said carriage in a manner to permit partial revolution about a centrally disposed vertical axis; two adjustable arms mounted to slide, longitudinally, across said holder base, one arm adapted to receive a shoe positioning pin, and the other provided with clamp means adapted to secure the free end of a brake shoe, the two arms adapted to co-act to hold a brake shoe in proper grinding position; and micrometer measuring means disposed to measure the distance from the center of said holder base to the face of said grinding means.

MARTIN M. FISHER.